(12) United States Patent
Siegel

(10) Patent No.: US 11,643,172 B2
(45) Date of Patent: May 9, 2023

(54) MOORING LATCH FOR MARINE STRUCTURES

(71) Applicant: Atargis Energy Corporation, Pueblo, CO (US)

(72) Inventor: Stefan G. Siegel, Pueblo, CO (US)

( * ) Notice: Subject to any disclaimer, the term of this patent is extended or adjusted under 35 U.S.C. 154(b) by 158 days.

(21) Appl. No.: 17/149,272

(22) Filed: Jan. 14, 2021

(65) Prior Publication Data
US 2022/0219790 A1 Jul. 14, 2022

(51) Int. Cl.
*B63B 21/04* (2006.01)
*B63B 21/00* (2006.01)

(52) U.S. Cl.
CPC ........ *B63B 21/04* (2013.01); *B63B 2021/004* (2013.01)

(58) Field of Classification Search
CPC ... B63B 21/04; B63B 2021/004; B63B 21/50; B63B 21/08
See application file for complete search history.

(56) References Cited

U.S. PATENT DOCUMENTS

| | | | | |
|---|---|---|---|---|
| 4,258,888 A * | 3/1981 | Sawn | ........................ | B64F 1/12 114/261 |
| 4,892,495 A * | 1/1990 | Svensen | ................ | B63B 21/508 441/5 |
| 7,686,583 B2 | 3/2010 | Siegel | | |
| 7,762,776 B2 | 7/2010 | Siegel | | |
| 8,100,650 B2 | 1/2012 | Siegel | | |
| 8,937,395 B2 | 1/2015 | Siegel | | |
| 9,115,687 B2 | 8/2015 | Siegel | | |
| 9,297,351 B2 | 3/2016 | Siegel | | |
| 10,427,758 B2 * | 10/2019 | Benoit | .................... | B63B 21/04 |
| 2002/0117098 A1 * | 8/2002 | Boatman | ............... | B63B 21/508 114/230.12 |

FOREIGN PATENT DOCUMENTS

WO 2014026019 A2 2/2014
WO 2014026027 A2 2/2014

* cited by examiner

*Primary Examiner* — Anthony D Wiest
(74) *Attorney, Agent, or Firm* — David T. Millers

(57) ABSTRACT

A mooring latch includes a passive foundation portion and a latching portion. The latching portion includes a mechanism, a conical surface shaped to mate with a conical surface of the passive portion, a connector for connection to a mooring structure and permitting rotation about a horizontal axis. The mechanism has a latched configuration that mates the conical surfaces and permits rotations about a shared vertical axis of the conical surfaces. A mooring line threaded through the passive and latching portions and equipped with one or more stops may be used to guide the latching portion to or from the passive portion and to actuate latching or unlatching or the mooring latch.

20 Claims, 8 Drawing Sheets

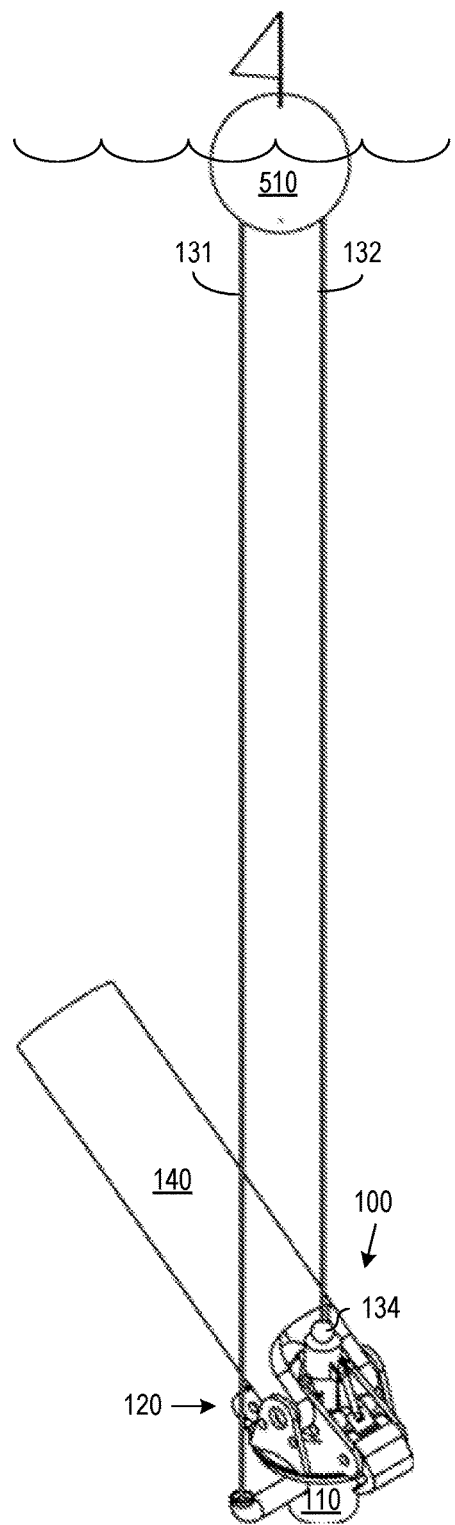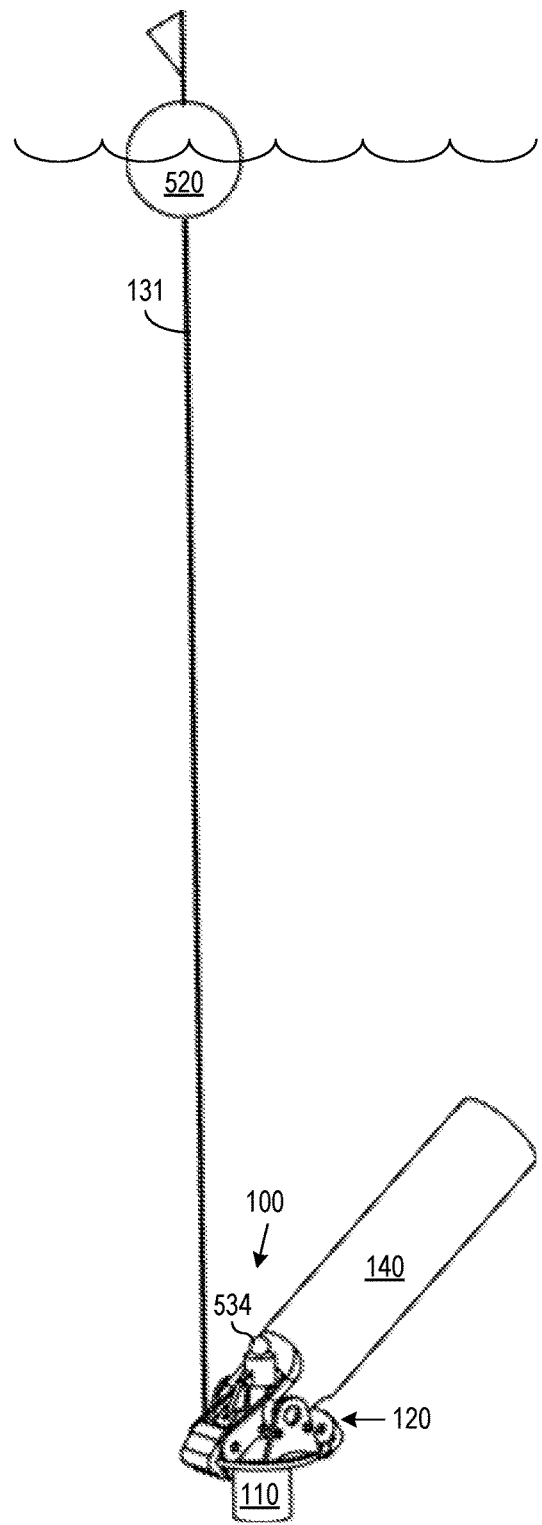
*FIG. 5-1*  *FIG. 5-2*

MOORING LATCH FOR MARINE STRUCTURES

FEDERALLY SPONSORED RESEARCH OR DEVELOPMENT

This invention was made with government support under grant No. DE-EE0008626 awarded by the Department of Energy. The government has certain rights in the invention.

CROSS-REFERENCE TO RELATED APPLICATIONS

This patent document is related to co-filed U.S. patent application Ser. No. 17/149,388, entitled "Mooring Structure for Ocean Wave Energy Converters," which is hereby incorporated by reference in its entirety.

BACKGROUND

Traditional offshore installation processes may permanently or semi-permanently attach a structure to the ocean floor. Since these operations may occur only once during the life cycle of the structure, non-reversible operations like filling a gap between two parts of the structure with grout are common and state of the art. Even reversible operations like bolting flanges together often require divers or under water vehicles to undertake. Such offshore installation processes and other offshore activities are often time consuming and costly, and in many cases, require highly skilled technicians and/or specialized equipment. Structures and methods for commissioning, maintaining, and decommissioning offshore structures, without need for special equipment and that ideally avoid subsea activities entirely, would be desired.

SUMMARY

In accordance with an aspect of the invention, a device, referred to as mooring latch, structurally attaches or latches offshore structures to each other, and specifically may attach a structure such as a wave energy converter to a foundation or mounting point installed on the ocean floor. A vessel at the water surface can be used to complete latching or unlatching of the mooring latch without need for any specialized tools, divers, or Remotely Operated Vehicles (ROVs). Once latched, the mooring latch provides a connection or attachment that can be loaded in compression or tension, while the latch is free to swivel around two axes. These swivel degrees of freedom reduce the precision required for installation of the foundation or mooring point and thus reduce the overall costs of a mooring system using the latch.

In one example in accordance with the present disclosure, a mooring latch includes a passive portion and an active or latching portion. The passive portion typically has male features and is typically the portion of the mooring latch attached to the seafloor, although the passive portion may have male or female features and is not strictly required to be use as the foundation of the mooring latch. The passive portion is passive in that it does not require moving parts or actuators. Further, the passive portion does not require parts that are expected to wear with use so that the passive portion may be maintenance-free, which makes the passive portion well suited to be the foundation portion of the mooring latch. The latching portion of the mooring latch includes moving parts that may be cable operated without need of submerged actuators, so that a winch located on a vessel at the surface of the ocean may actuate the latching or unlatching functions. The latching portion typically has female features, although the latching portion could alternatively have male or female features that are complementary to female or male features of the passive portion of the mooring latch.

Latching may be achieved using a single mooring line with two stops. The mooring line may be threaded through the foundation portion. Both ends of the mooring line may be kept at or near the ocean surface, e.g., on a surface vessel, while the foundation portion of the mooring latch is dropped or lowered using the mooring line from a surface vessel to the ocean floor where the foundation portion attaches to the ocean floor. The mooring line may then be used to guide the complementary portion, e.g., the latching portion, of mooring latch from near the ocean surface into contact with the foundation portion, where male and female features of the two portions of the mooring latch mate and position the two portions for the latching operation. The stops on the mooring line may then be used to actuate the latching function of the latching portion of the mooring latch. In particular, hauling in one end of the mooring line closes the latching portion and latches the two portions together.

Hauling in an opposite end of the mooring line unlatches the latching portion of the latch from the passive portion. Accordingly, when the passive portion is the foundation portion of the mooring latch, the moving parts of the latching portion can be brought to the surface, e.g., for servicing. The latching portion of the mooring latch is thus serviceable and may contain all of the parts of the latch that are most likely to experience wear, e.g., moving parts or bearing material that enables the mooring latch to swivel.

In a further example of the present disclosure, the mooring latch may be a component of a more complex complete mooring systems that enables commissioning, decommissioning, maintenance, and operation of marine devices like wave or tidal energy converters, or any other marine structure that may need to be moored and unmoored repeatedly during the structure's design life.

Some further examples of the present disclosure include a mooring latch and latching and unlatching processes that allow the commissioning and decommissioning of an offshore structure with no more equipment needed than a common mooring winch, which may be located on a work boat. In addition to fast and straightforward installation, the ability to swivel may provide a mooring latch with relaxed precision requirements for placement and orientation of the foundation and latching components, which further reduces time and cost needed for the installation of offshore structures.

BRIEF DESCRIPTION OF THE DRAWINGS

FIGS. 2-1 and 2-2 show perspective and cross-sectional view of a passive portion of a mooring latch system in accordance with an example of the present disclosure.

FIGS. 3-1, 3-2, and 3-3 respectively show a side view, a cross-sectional view, and a perspective view of a latching portion of a mooring latch in accordance with an example of the present disclosure.

FIGS. 4-1, 4-2, 4-3, and 4-4 are cross-sectional views illustrating a process of latching a mooring latch in accordance with an example of the present disclosure.

FIGS. 5-1 and 5-2 show installed respective configurations of a mooring latch with both ends of a mooring line extending from the mooring latch to the ocean surface and with one end of the mooring line extending from the mooring latch to the ocean surface.

FIGS. 6-1, 6-2, 6-3, and 6-4 are cross-sectional views illustrating a process of unlatching a mooring latch in accordance with an example of the present disclosure.

The drawings illustrate examples for the purpose of explanation and are not of the invention itself. Use of the same reference symbols in different figures indicates similar or identical items.

DETAILED DESCRIPTION

Figure 1:
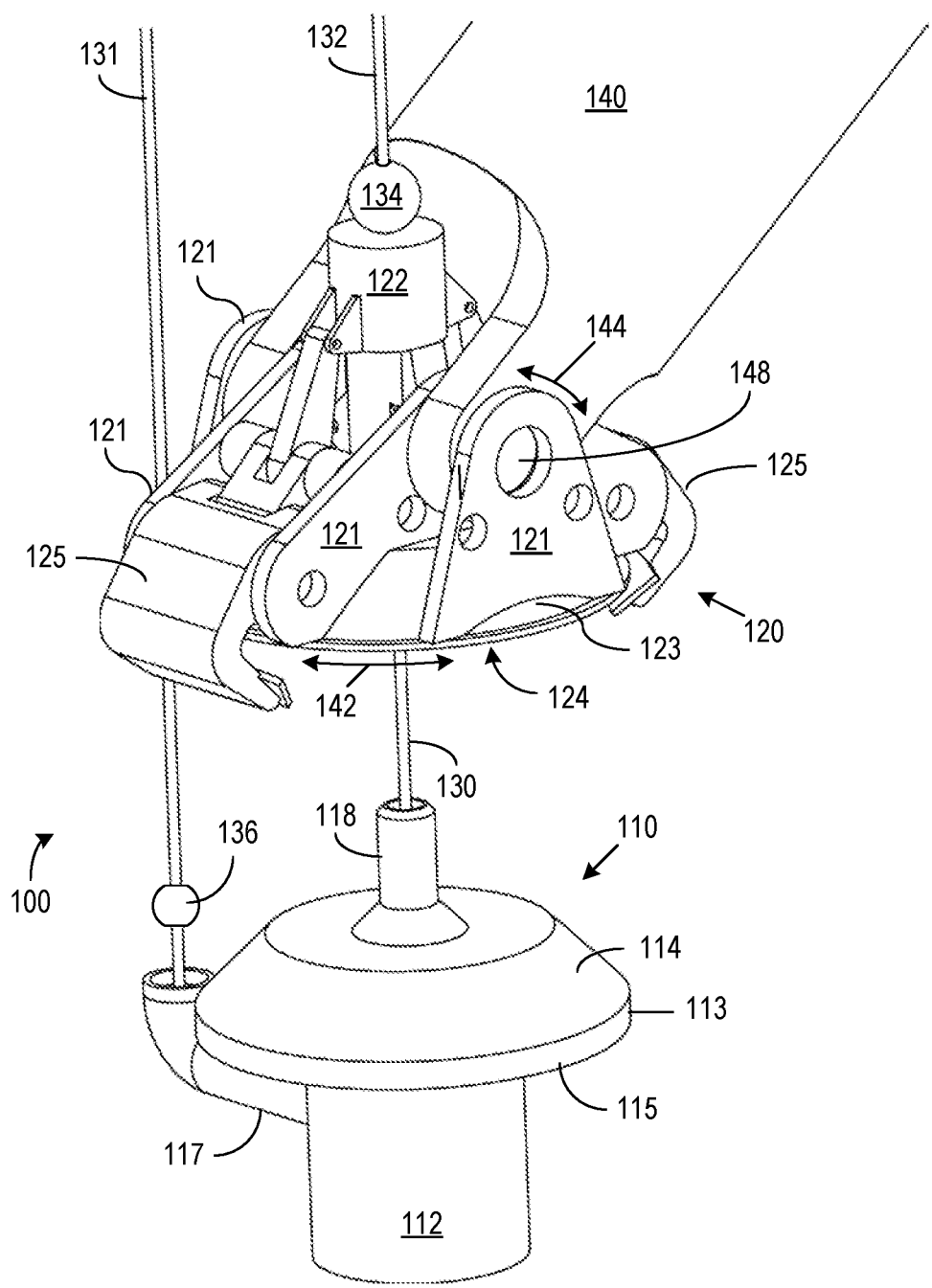
FIG. 1 shows a perspective view of a mooring latch system in accordance with an example of the present disclosure.

A mooring latch in accordance with one example of the present disclosure includes three main components, a passive portion, an active or latching portion, and a mooring line. FIG. 1 shows a mooring latch 100 in accordance with one example of the present disclosure. Mooring latch 100 include a passive portion 110 and a latching portion 120 that are disengaged from each other in FIG. 1. In the example of FIG. 1 passive portion 110 has male features and is employed as a foundation mounted directly or indirectly on the ocean floor. Accordingly, passive portion 110 is sometimes referred to herein as the male portion or the foundation portion. In alternatives to the example of FIG. 1, the passive portion of a mooring latch may have male or female features and is not strictly required to be the foundation portion of a mooring latch. Similarly, latching portion 120 of FIG. 1 has female features and is sometimes referred to herein as female portion 120. More generally, the active or latching portion of a mooring latch as disclosed herein may have male or female features that are complementary to female or male features on the passive portion of the mooring latch.

A mooring line 130 as shown in FIG. 1 is threaded through latching portion 110 and passive portion 120 and has two end 131 and 132 extending to the ocean surface, e.g., to one or more winches on a surface vessel (not shown). Mooring line 130 may, for example, be a metal or synthetic cable, rope, or wire with a length greater than twice the operating depth of the foundation portion 110. Two stops 134 and 136 are attached along the length of mooring line 130.

Figures 1, 2:
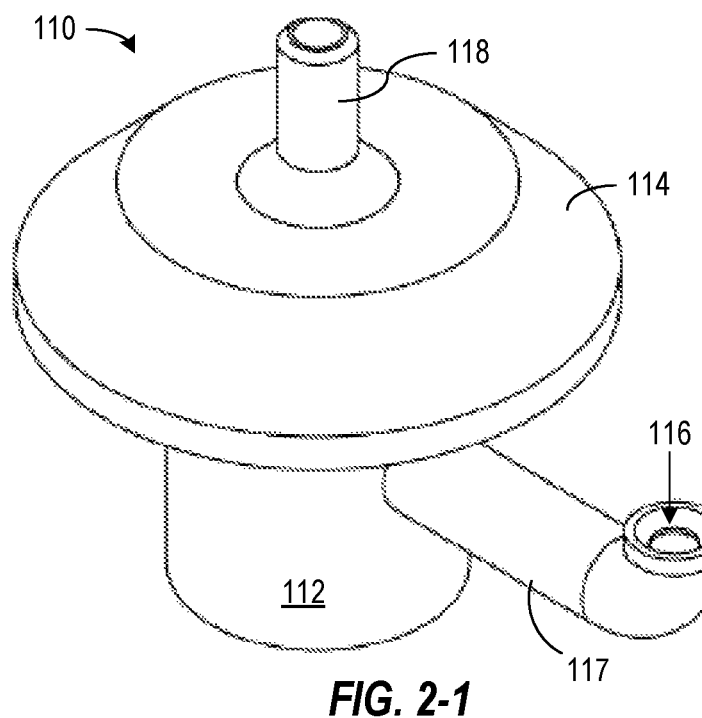
Figure 2:
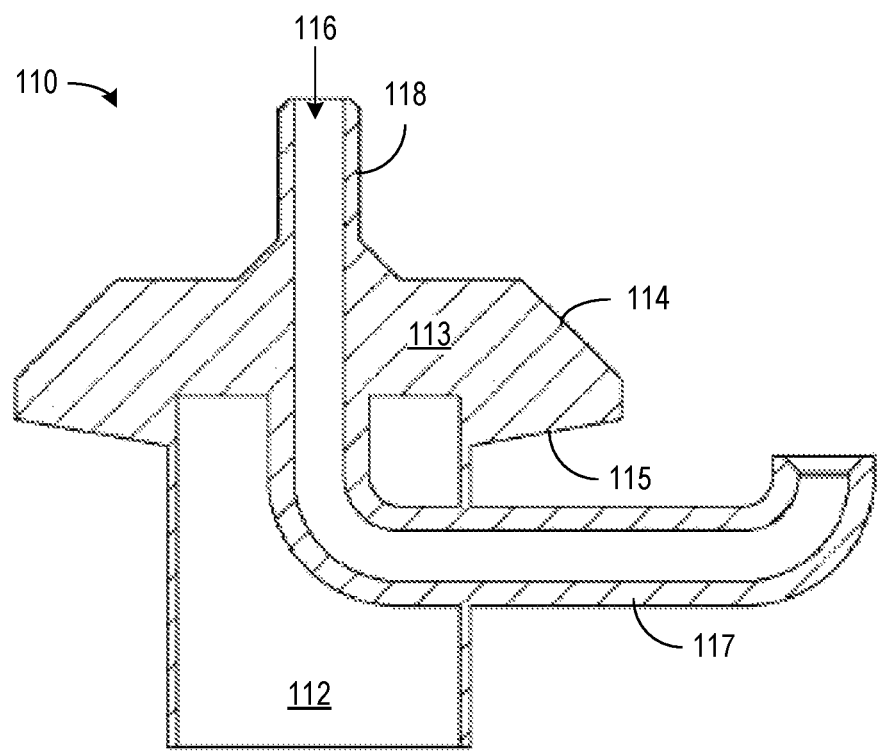

Passive portion 120, shown in FIG. 1 and in more detail in FIGS. 2-1 and 2-2, is a passive assembly that has no moving parts. The size of passive portion 120 generally depends on the load from the structure being moored. For example, with a cycloidal wave energy converter (CycWEC), the loads due to lift of the hydrofoil(s) of the CycWEC dictate the sizes of portions of mooring latch 100, so that the surface pressure between the parts does not exceed a maximum permissible design strength of the bearing material. Typically, mooring of a full-scale ocean wave energy converter requires passive portion 120 to have dimensions on the on the order of one or more meters in diameter and one or more meters tall. Passive portion 120 is intended to be anchored, embedded, or otherwise directly or indirectly attached to the ocean floor at a location where a mooring platform or other offshore structure may be desired. For an anchoring process, mooring line 130 may be threaded through a cable guide 116 in passive portion 110, and both ends 131 and 132 of mooring line 130 may be kept above the surface of the ocean while passive portion 110 is dropped or lowered to the ocean floor. In particular, conventional winches on which ends 131 and 132 of mooring line 130 are wound may lower passive portion 110 to the ocean floor or a submerged structure on which passive portion 110 will be mounted. Anchoring or attachment of passive portion 110 may be completed by any desired process or technique. In one example of the present disclosure, passive portion 110 may, however, include an integrated foundation or attachment feature. For example, a bottom skirt 112 in the illustrated example of FIG. 1 may be shaped to embed as a suction caisson in sand or clay at the ocean floor.

The upper part of passive portion 110 is shaped to engage latching portion 120 of mooring latch 100. In particular, passive portion 110 includes a body 113 having a male conical surface 114 that is shaped to mate with a female conical surface 124 of a body 123 of latching portion 120. A projection or male guide 118 extending from body 113 is also shaped to mate with a corresponding female guide 128 (shown in FIGS. 3-1, 3-2, and 3-3) of body 123 of latching portion 120. A bottom surface 115 of body 113 provides a mating surface for claws 125 of latching portion 120. During a mating process, vertical projection 118 on the top side of passive portion 110 serves as a guide for complementary female guide 128 in latching portion 120. Passive portion 110 further includes a cable guide 116 through which the mooring line 130 is threaded. Cable guide 116 is a tubular opening that continuously extends through projection 118 and a lateral standoff 117. As described further below, cable guide 116 is sized to permit stop 136 to pass through passive portion 110 and reach latching portion 120 during an unlatching process.

Passive portion 110 has body 113 with a male conical surface 114, and latching portion 120 has a body 123 with a complementary female conical surface 124 as described above. Once mooring latch 100 is latched, conical surface 124 of latching portion 120 sits flush on conical surface 114 of passive portion 110, forming a rotational bearing that provides a rotational degree of freedom 142 for rotation of the two portions 110 and 120 of latch 100 relative to each other around the vertical center axis, e.g., about the axis of the conical surfaces 114 and 124. The inside, e.g., surface 124, of body 123 of latching portion 120 may be lined with a bearing material to reduce friction within this bearing and prevent wear, particularly to prevent wear on surface 114. The tips of claws 125, which contact surface 115 of body 110 when mooring latch 100 is latched, may similarly be coated with bearing material to reduce friction during rotations 142 and reduce or avoid wear on passive portion 110. The bearing material on surface 114 and the tips of claws 125 may be any sliding water lubricated bearing materials in use in the marine industry including, for example, bronze, white metal, rubber, polytetrafluoroethylene (PTFE), and proprietary elastomeric polymers Body 123 of latching portion 120 further includes hinge plates 121 with openings 129 used to connect mooring latch 100 to a moored structure, e.g., a leg 140 of a mooring platform, through a fork-and-pin joint, e.g., a pair of aligned axels or pins 148 of the moored structure engaged in openings 129 in hinge plates 121. The fork-and-pin joint provides the moored structure with a second rotational degree of freedom 144.

The two rotational degrees of freedom 142 and 144, e.g., around the nominally vertical axis of mooring latch 100 as well as around the nominally horizontal axis of the pins 148 of the fork-and-pin joint, enable ocean floor installation of passive portion 110 with relatively larger tolerances for the orientation of passive portion 110. In particular, surfaces 114 and 124 are symmetric about alignment features 118 and 128 so that the angular position of passive portion 112 about the (nominally vertical) axis of features 118 and 128 does not affect the latching process, and tilt of passive portion 110 from vertical can be accommodated by rotations 144 of latching portion 120. This capability can greatly reduce the cost of installing passive or foundation portion 110 of latch 100, while still preserving the full functionality of mooring latch 100.

Figures 1, 3:
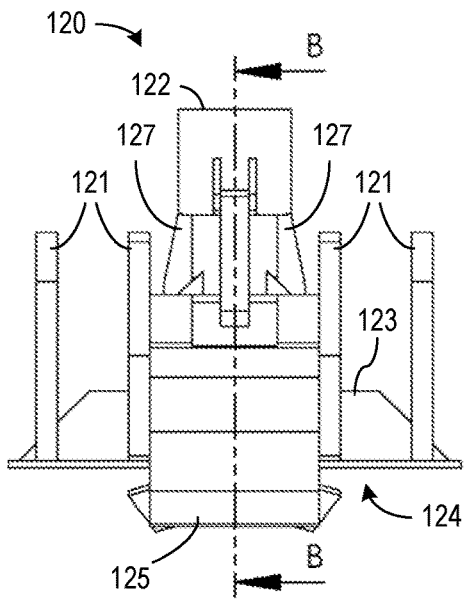
Figures 2, 3:
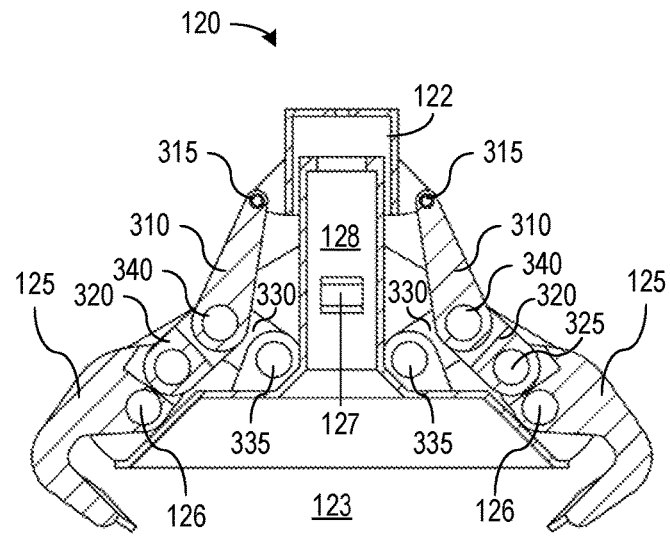
Figure 3:
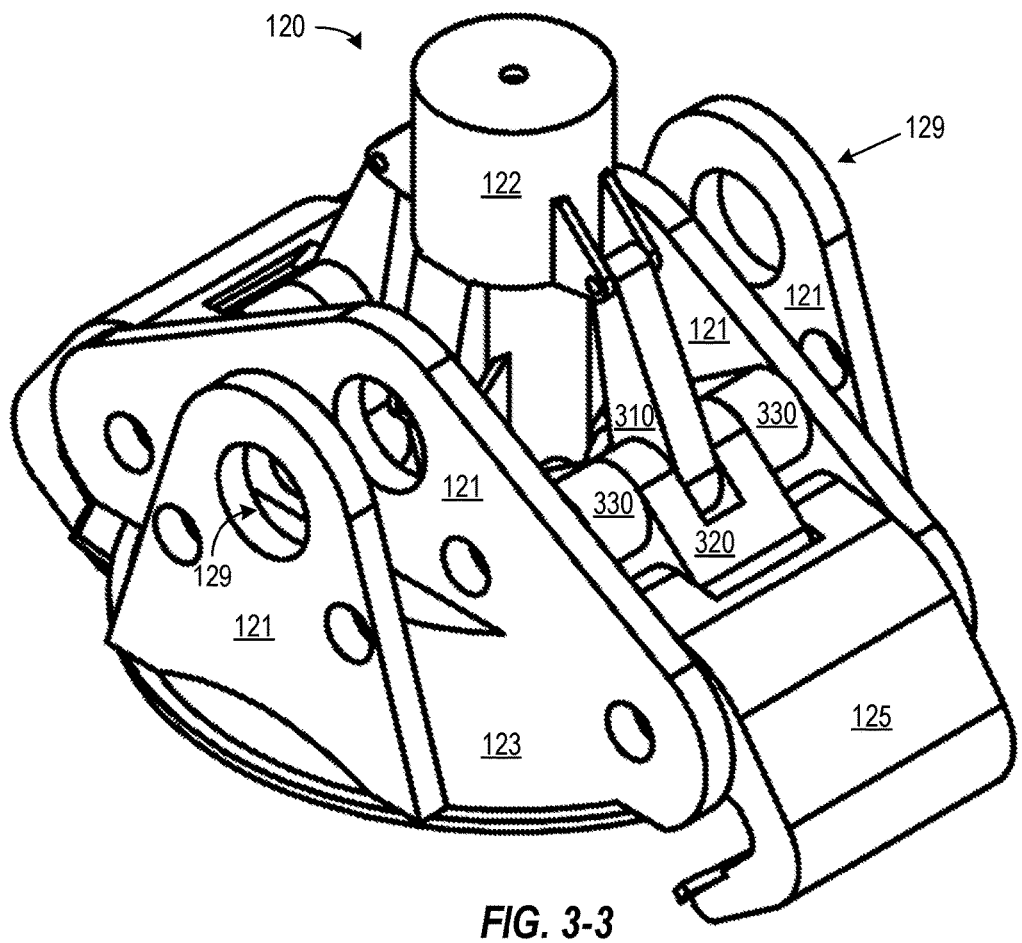

FIGS. 3-1, 3-2, and 3-3 respectively show a side view, a cross-sectional view, and a perspective view of latching portion 120 of mooring latch 100 of FIG. 1. Latching portion 120 generally has dimensions matching those of passive portion 110, e.g., a diameter and height on the order of one or more meters depending on the design load to be moored. As illustrated, latching portion 120 includes an assembly of movable components attached to hinge plates 121 on a body 123 of latching portion 120 and providing a lever mechanism capable of rotating claws 125 on pivots 126. The range of rotation extends between an open position used for mating or unmating latching portion 120 and passive portion 110 and a closed position that keeps latching portion 120 latched to passive portion 110. Actuation of the lever mechanism is achieved by moving a latching ring 122, which is free to slide upward and downward on the center protrusion (around feature 128) of body 123. In illustrated example, the lever mechanism uses two claws 125, and each claw 125 has three bar linkages, a latching linkage 310, an outer linkage 320, an inner linkage 330 that are connected to a common pivot or joint 340. In alternative examples, a mooring latch may have a single actuated claw or two, three, four, or more claws arranged around the perimeter of latching portion 120. For each claw 125, latching linkage 310 connects a pivot 315 on ring 122 to the common joint 340 associated with the claw 125. Each outer linkage 320 connects a joint 325 on the associated claw 125 to the associated common joint 340. Each inner linkage 330 connects a pivot 335 on body 123 to the associated common joint 340. In general, moving ring 122 downward (or upward) causes linkages 310 to push (or pull) respective common joints 340 down (or up), causing linkages 320 and 330 to splay (or fold) and push (or pull) joints 325 on claws 125 outward (or inward). Claws 125 rotate about their pivots 126 on body 123 when the lever mechanism pushes or pulls on joints 325. The function of bar linkages 310, 320, and 330 and claws 125 is explained in further detail below in the description of engagement/disengagement processes of latch 100.

Mooring line 130 can be employed for installation of passive portion 110 on the ocean floor, for guiding latching portion 120 from the ocean surface to contact the installed passive portion 110, for latching the two portions 110 and 120 of mooring latch 100, and unlatching latching portion 120 from passive portion 110. As described above, two stops 134 and 136 may be clamped or otherwise attached to mooring line 130. In one example of the present disclosure, stop 134 may be larger than stop 136. In particular, stop 136 may be small enough to pass through guide tube 116 in passive portion 110, and stop 136 may be attached to mooring line 130 before or after mooring line 130 is threaded through male portion 118 for installation of passive portion 110. Neither stop 136 nor stop 134 is small enough to fit through the opening in ring 122 in latching portion 120, so that one or more stop 136 or 134 may be attached or reattached to line 130 after line 130 is threaded latching portion 120.

Installation of passive portion 110 in the ocean may include threading line 130 through passive portion 110, e.g., through guide tube 116. Securing ends 131 and 132 of line 130 on a surface vessel. One or both ends 131 and 132 may be wound on a winch or winches on the surface vessel. A U-shaped portion of mooring line 130 may then be used to lower or drop passive portion 110 from the ocean surface to the ocean floor or a submerged structure through which passive portion 110 is affixed or secured to the ocean floor. After passive portion 110 is secured, the two ends 131 and 132 of mooring line 130, which remained at the surface during installation of passive portion 110, may be housed in a floating buoy that also serves as a marker that identifies the location of passive portion 110 of mooring latch 100 after installation of passive portion 110.

Figures 1, 4:
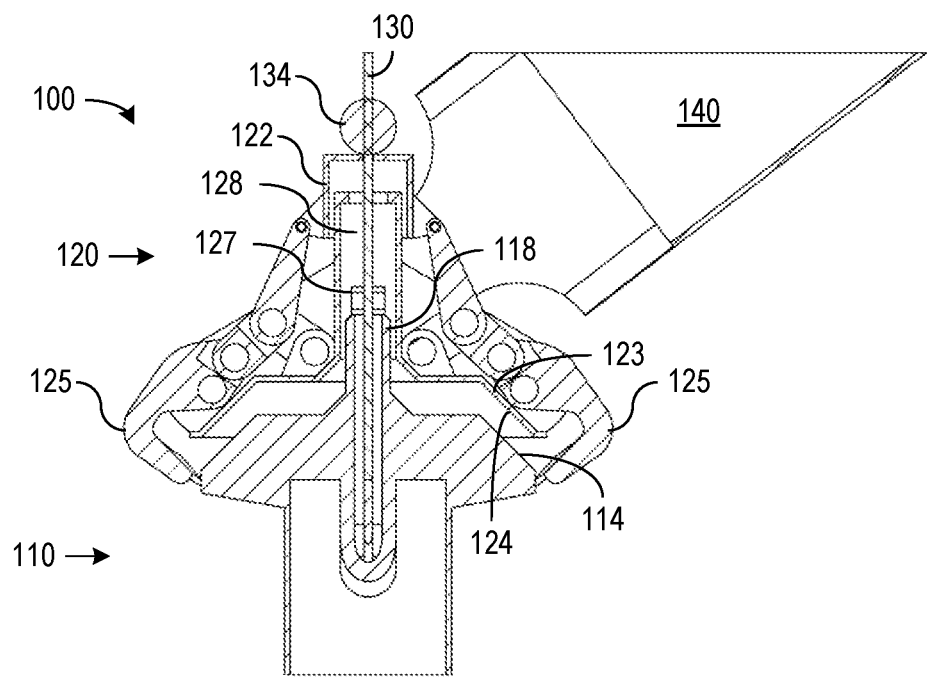
Figures 2, 4:
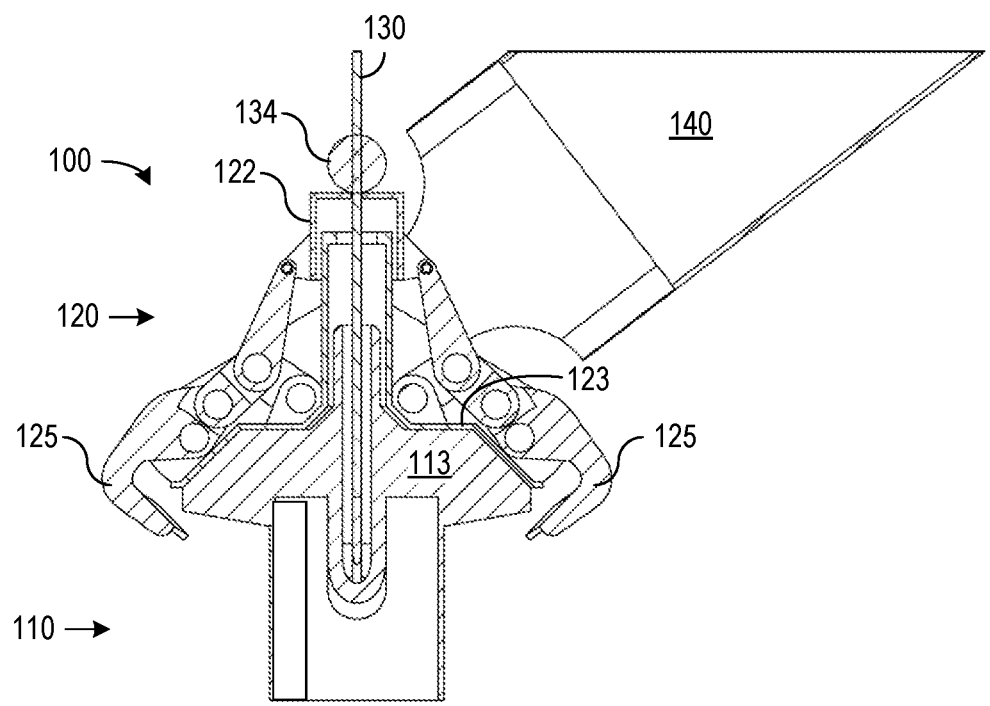
Figures 3, 4:
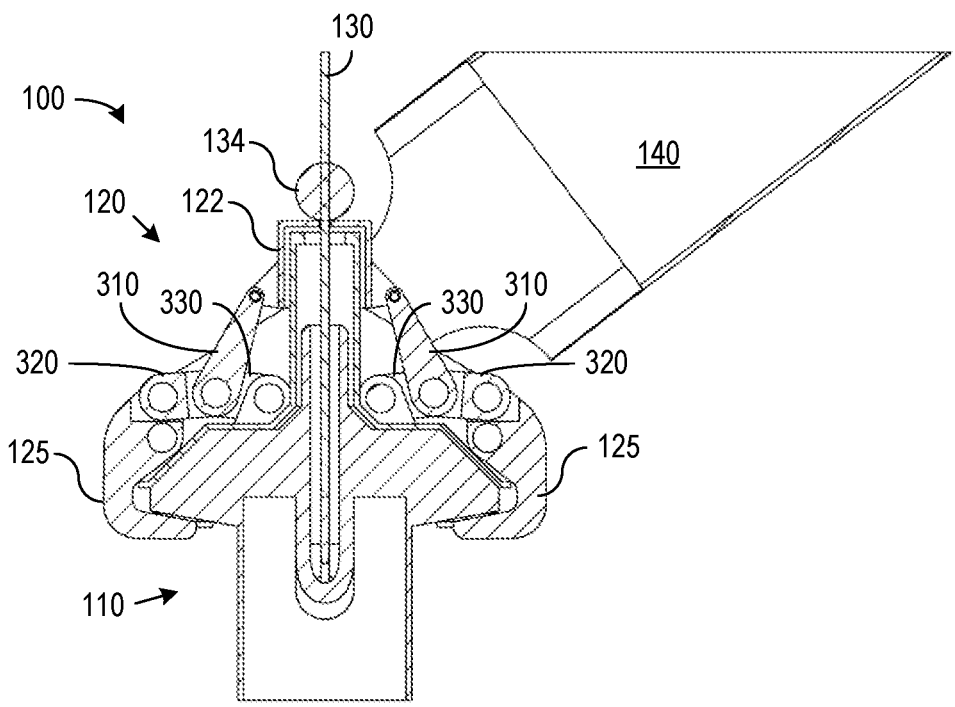
Figure 4:
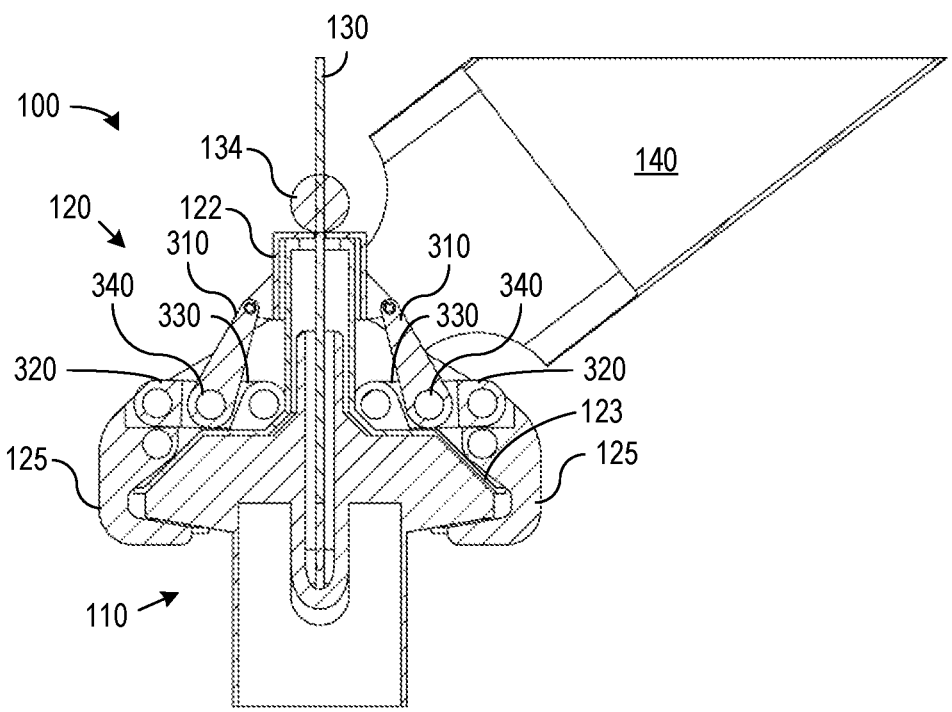

A structure to be moored, e.g., a mooring platform, can be installed at the same time or after the foundation portion of the mooring latch is installed. For subsequent installation, the structure to be moored can be moved to the location of foundation portion 110, e.g., to the location of the buoy or other structure holding the ends 131 and 132 of mooring line 130. A latching process may then begin with removing stop 134 (if necessary) and threading end 132 of mooring line 130 through the center, e.g., female feature 128 and latching ring 122, of latching portion 120, and attaching or reattaching, e.g., clamping, the larger (latching) stop 134 above latching ring 122 of latching portion 120. At that point, line end 130 extends through latching portion 120 and down to and into foundation portion 110. Line end 131, which exits the eccentric part 117 of passive portion 110, may then be pulled or drawn upward, towards the surface. A standard mooring winch located on a work vessel or tugboat may be used to draw in end 131 of mooring line 130. As a result of the winching activity, the large stop 134 clamped to the other end 132 of mooring line 130 moves downward and pulls the latching portion 120 of latch 100 toward the submerged foundation portion 110 of the latch 100. Blocking levers 127 prevent stop 134 from pushing latching ring 122 downward relative to body 123 and prevent claws 125 from closing until latching portion 120 contacts foundation portion 110 as shown in FIG. 4-1. Mooring line 130 particularly guides latching portion 120 until female guide feature 128 of latching portion 120 begins to engage male guide feature 118 of passive portion 110. Guide features 118 and 128 align portions 110 and 120 for latching.

Once the two portions 110 and 120 of latch 120 have mated, as shown in FIG. 4-2, guide feature 118 pushes blocking levers 127 outward, thus allowing latching ring 122 to slide downward and actuate the lever system to close latching claws 125. FIG. 4-2 shows a configuration in which conical female surface 124 of latching portion body 123 is on male conical surface 114 of passive portion body 113 and further downward movement of latching portion 120 is prevented or inhibited. In the configuration of FIG. 4-2, further drawing in of line end 131 will cause stop 132 to push latching ring 122 down relative to body 123 and close claws 125.

A latching process may be considered complete when stop 134 has pushed latching ring down so that inner and outer linkages 330 and 320 line up in a straight line, as shown in FIG. 4-3. However, a vertical load from the structure 140 to be moored pushing down or body 123 and particularly on the joint attaching inner linkage 330 to body 123 could at this point in the latching process force claws 125 open and cause latching portion 120 to release foundation portion 110, if the tension of mooring line 130 were removed. To prevent this, latching linkage 310 is pushed further downward until inner and outer linkages 330 and 310 have reached a position where the pin 340 connecting all three linkages 310, 320, and 330 is resting on top of female mooring latch body 123, as shown in FIG. 4-4. The over center position of the three pins in the claw actuation mechanism prevents latch 100 from opening, and the mooring latch has reached the operational state where mooring latch 100 can transmit loads in any direction from the moored structure 140 to the foundation. Once over the center, mooring line 130 serves no structural purpose and is load free, and mooring line 130 could even be removed or replaced. In a typical operation, mooring line 130 is left in place and the ends of mooring line may be stored in a surface-mounted buoy, e.g., for use in an unlatching process described next.

FIGS. 5-1 and 5-2 show installed configurations of mooring latch 100 in which mooring latch 100 latches a moored structure 140, e.g., a leg of a mooring platform, to foundation portion 110. (As described above, this attachment bears both compression and tension from moored structure 140 but permits rotation of moored structure 140 about two perpendicular axes.) FIG. 5-1 particularly shows a configuration in which both ends 131 and 132 of the mooring line are attached to a buoy 510 and accessible at the ocean surface. FIG. 5-2 shows a configuration in which only one end 131 is attached to a buoy 520 and immediately accessible at the ocean surface. The other end 132 of the mooring line in the configuration FIG. 5-2 is submerged but connected to a buoyant stop 534, so that if more of line end 131 is fed out, buoyant stop 534 can rise to the surface for use. An advantage of the single line setup of FIG. 5-2 is that the single line avoids the problem of two lines getting twisted around each other as may happen in the configuration of FIG. 5-1. A disadvantage of the single line set up is that in order to retrieve the submerged end of the mooring line, stop 534 needs to provide enough buoyancy to bring a length of the mooring line back to the surface for surface. With either configuration, both ends 131 and 132 of mooring line 130 can be accessed at the surface for an unlatching of mooring latch 100.

Figures 1, 6:
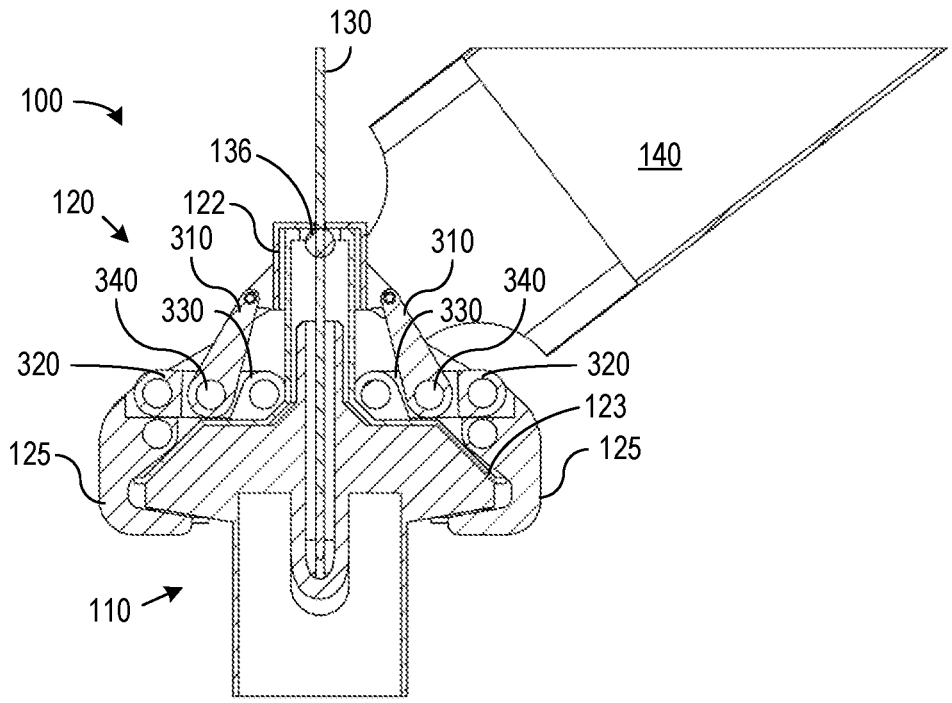
Figures 2, 6:
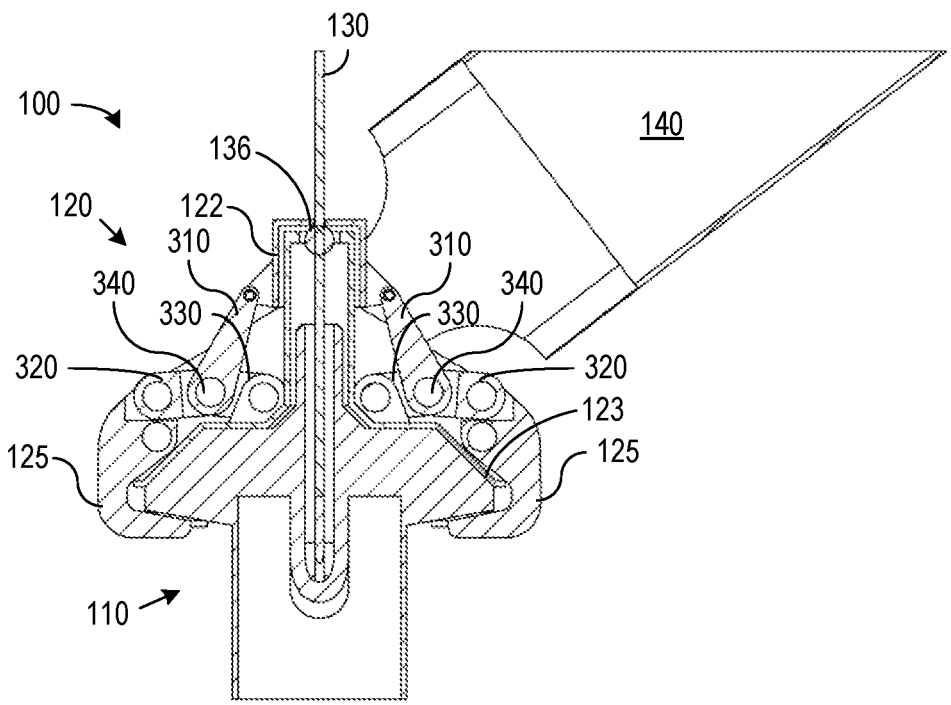
Figures 3, 6:
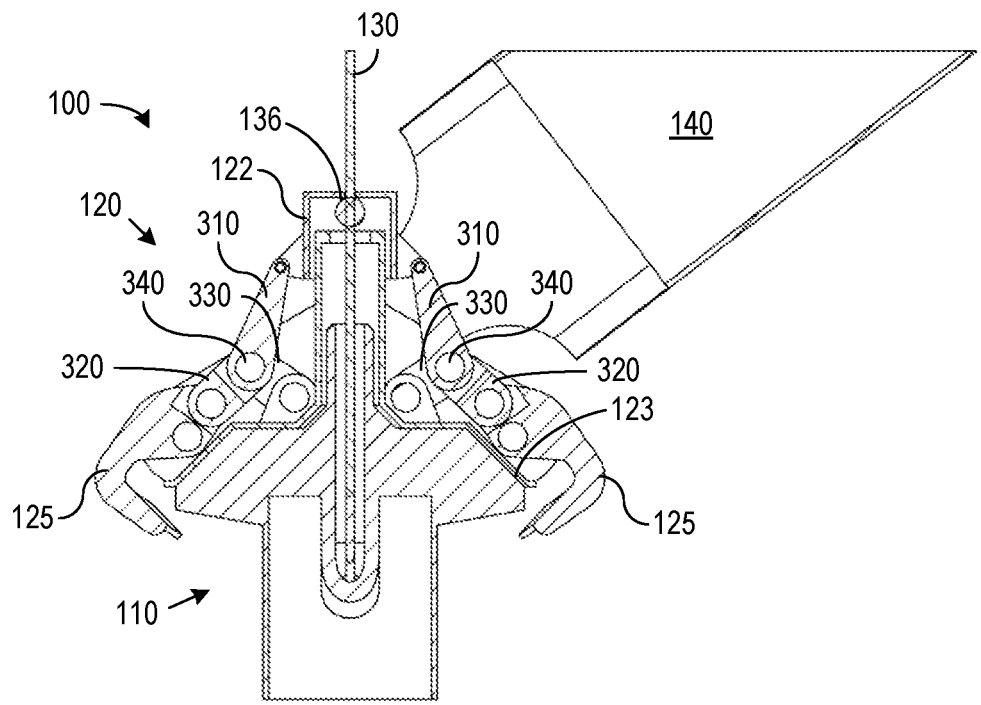
Figures 4, 6:
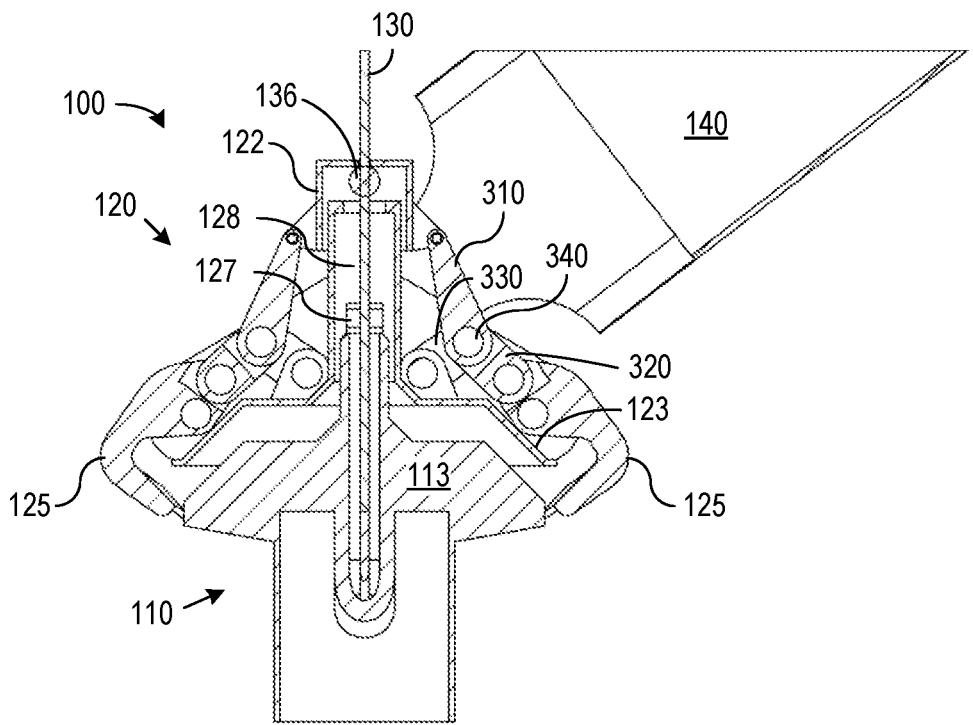

FIGS. 6-1, 6-2, 6-3, and 6-4 show configurations of mooring latch 100 during an unlatching process in accordance with an example of the present disclosure. In order to disengage or unlatch the two portions 110 and 120 of mooring latch 100, the end 132 of mooring line 130 opposite to the end 131 that was pulled for engaging latch 100 is pulled upward. As end 132 is drawn up, the smaller stop 136 clamped to line 130 is initially pulled down and enters the cable guide 116 in male portion 110 of mooring latch 100 before being pulled out of guide feature 118 and reaching an inside surface of latching ring 122 as shown in FIG. 6-1. Once more tension is applied to mooring line 130, latching ring 122 starts to travel upward, which removes the over center condition of linkages 310, 320, and 330, as shown in FIG. 6-2. Further upward force that line 130 and stop 136 exerts onto latch 100 push claws 125 to the open position shown in FIG. 6-3. Once claws 125 are open, latching portion 120 is free to slide upward, as shown in FIG. 6-4, completing the unlatch process. Blocking levers 127 move in female guide 128 as male guide 118 moves out. In particular, blocking levers 127 may be spring loaded to assume a position that blocks downward movement of latching ring 122 once latching ring 122 has moved far enough upward that claws 125 are in the open position and the protrusion 118 of the male portion 110 no longer forces blocking levers 127 outward. The unlatched configuration of latch 100 in FIG. 6-4 is the same as the configuration of FIG. 4-1, so that another latch engagement process could be started or latching portion 120 could be raised to the surface by continuing to pull up on end 132 of mooring line 130.

Latching portion 120 includes moving parts such as linkages 310, 320, 330 and latching ring 122 that may wear or break with use or aging and includes bearing material on surfaces 124 and the tips of claws 125 that ride on surfaces 114 and 115 of passive portion 110 when latching portion 120 rotates. Additionally, pins 148 that permit rotation of moored structure 140 relative to latch 100 are also subject to wear. If any of the moving or wearing parts fail or need maintenance, the unlatching process described above can detach latching portion 120 from foundation portion 110 and raise latching portion 120 and the submerged part of mooring structure 140 to the ocean surface for maintenance, repair, or replacement.

The mooring latch disclosed herein may be part of a complete mooring system such as described in co-filed U.S. patent application Ser. No. 17/149,388, entitled "Mooring Structure for Ocean Wave Energy Converters," which was incorporated by reference above. In particular, the mooring latch disclosed herein may form part of a fully submerged wave energy converter system, where multiple mooring latches are used to commission a subsurface platform for the wave energy converter system.

Although particular implementations have been disclosed, these implementations are only examples and should not be taken as limitations. Various adaptations and combinations of features of the implementations disclosed are within the scope of the following claims.

What is claimed is:

1. A mooring latch comprising:
a first body including a first conical surface;
a second body including a second conical surface shaped to mate with the first conical surface, the second body including a connector adapted to connect the second body to a structure to be moored, the connector providing a connection that permits rotation of the structure to be moored;
a latching mechanism mounted on one of the first and second body and having an unlatched configuration that permits separation of the first and second body and a latched configuration that holds the first body and the second body together, wherein the latched configuration holds the first conical surface mated to the second conical surface and permits rotation of the first body relative to the second body about a shared axis of the first conical surface and the second conical surface;
a line threaded through a guide tube in the first body and the latching mechanism on the second body; and
a first stop and a second stop attached to the line on opposite sides of the second body, wherein:
hauling in a first end of the line brings the first stop into contact with the latching mechanism and moves the latching mechanism to the latched configuration; and
hauling in a second end of the line brings the second stop into contact with the latching mechanism and moves the latching mechanism to the unlatched configuration.

2. The mooring latch of claim 1, wherein the first body is a passive structure shaped to attach to the ocean floor.

3. A mooring latch comprising:
a first body including a first conical surface;
a second body including a second conical surface shaped to mate with the first conical surface, the second body including a connector adapted to connect the second body to a structure to be moored, the connector providing a connection that permits rotation of the structure to be moored;
a latching mechanism mounted on one of the first and second body and having an unlatched configuration that permits separation of the first and second body and a latched configuration that holds the first body and the second body together, wherein the latched configuration holds the first conical surface mated to the second conical surface and permits rotation of the first body relative to the second body about a shared axis of the first conical surface and the second conical surface; and a line threaded through a guide tube in the first body and the latching mechanism on the second body, wherein:

one of the first and second bodies further comprises a female guide feature;

another one of the first and second bodies further comprises a male guide feature shaped to engage with the female guide feature when the first and second bodies are aligned for the latched configuration.

4. The mooring latch of claim 3, wherein the guide tube extends through the male guide feature.

5. The A mooring latch comprising:

a first body including a first conical surface;

a second body including a second conical surface shaped to mate with the first conical surface, the second body including a connector adapted to connect the second body to a structure to be moored, the connector providing a connection that permits rotation of the structure to be moored;

a latching mechanism mounted on one of the first and second body and having an unlatched configuration that permits separation of the first and second body and a latched configuration that holds the first body and the second body together, wherein the latched configuration holds the first conical surface mated to the second conical surface and permits rotation of the first body relative to the second body about a shared axis of the first conical surface and the second conical surface; and a line threaded through a guide tube in the first body and the latching mechanism on the second body, wherein the first body comprises a lateral standoff through which the guide tube extends beyond a radius of the first conical surface.

6. The mooring latch of claim 5, further comprising:

a first stop attached to the line on a first side of the latching mechanism from which pulling on the line in a first direction causes the first stop to engage and actuate the latching mechanism; and a second stop attached to the line on a second side of the latching mechanism from which pulling on the line in a second direction causes the second stop to engage and actuates the latching mechanism.

7. The mooring latch of claim 6, wherein one or the first stop and the second stop is sized to pass through the guide tube.

8. A mooring latch comprising:

a first body including a first conical surface;

a second body including a second conical surface shaped to mate with the first conical surface, the second body including a connector adapted to connect the second body to a structure to be moored, the connector providing a connection that permits rotation of the structure to be moored; and a latching mechanism mounted on one of the first and second body and having an unlatched configuration that permits separation of the first and second body and a latched configuration that holds the first body and the second body together, wherein the latched configuration holds the first conical surface mated to the second conical surface and permits rotation of the first body relative to the second body about a shared axis of the first conical surface and the second conical surface, wherein the latching mechanism comprises:

a ring with a slide mounting on the second body; and one or more claw systems, each claw system comprising:

a claw with rotation mounting on the second body;

a first linkage having a joint coupling to the ring at a first end of the first linkage;

a second linkage having a joint coupling to the second body at a first end of the second linkage;

a third linkage having a joint coupling the claw at a first end of the third linkage; and a common joint coupled to second ends of the first linkage, the second linkage, and the third linkage.

9. The mooring latch of claim 8, wherein for each claw system, sliding the ring down lines up the second linkage and the third linkage in a straight line and positions the claw in the latched configuration and sliding the ring further down places the linkages in an over center position that maintains the latched configuration.

10. A passive portion of a mooring latch, the passive portion having a body comprising:

a conical surface;

a guide extending along an axis of the conical surface;

a projection extending laterally beyond a radius of the conical surface; and a guide tube extending laterally through the projection and vertically through the guide.

11. The passive portion of claim 10, wherein the body further comprises a bottom skirt shaped to embed as a suction caisson in an ocean floor.

12. A latching portion of a mooring latch, the latching portion comprising:

a body including a conical surface, a central guide along an axis of the conical surface, an opening extending through a top of the central guide, and hinge plates that attach to a moored structure;

a ring with a slide mounting on the body; and one or more claw systems, each claw system comprising:

a claw rotatably mounted on the body;

a first linkage having a joint coupling to the ring at a first end of the first linkage;

a second linkage having a joint coupling to the body at a first end of the second linkage;

a third linkage having a joint coupling the claw at a first end of the third linkage; and a common joint coupled to second ends of the first linkage, the second linkage, and the third linkage.

13. The latching portion of claim 12, wherein for each claw system, sliding the ring down lines up the second linkage and the third linkage in a straight line and positions the claw in the latched configuration and sliding the ring further down places the linkages in an over center position that maintains the latched configuration.

14. The latching portion of claim 12, further comprising the moored structure, the moored structure comprising:

a leg of a mooring platform; and one or more pins coupling the leg to the hinge plates.

15. A process for latching a mooring structure, the process comprising:

providing a line thread through a submerged foundation with a first end and a second end of the line being at an ocean surface;

threading the first end of the line through a latch mechanism of the mooring structure;

coupling a first stop to the line;

hauling in the second end of the line to cause the first stop to pull the latch mechanism downward and guide the latch mechanism to the submerged foundation where features of the submerged foundation and the latch mechanism align the latch mechanism for latching to the submerged foundation; and actuating the latch mechanism to latch the mooring structure to the submerged foundation by further hauling in the second end of the line.

16. The process of claim 15, further comprising keeping the first end of the line at the ocean surface during the process including hauling the second end of the line to actuate the latch mechanism.

17. The process of claim 15, wherein after actuating the latch mechanism to latch the mooring structure to the submerged foundation, the process further comprising hauling in the first end of the line actuate the latch mechanism to detach the mooring structure from the submerged foundation.

18. The process of claim 17, further comprising attaching a second stop to the line, wherein hauling in the first end pulls the second stop through the submerged foundation into contact with the latch mechanism causing actuation of the latch mechanism.

19. The process of claim 17, further comprising further hauling in the first end of the line to raise the latch mechanism to the ocean surface.

20. The process of claim 19, further comprising after raising the latch mechanism to the ocean surface performing an operation selected from a group consisting of maintenance, repair, and replacement of a portion of the mooring structure.

* * * * *